United States Patent [19]
Frianeza-Kullberg

[11] Patent Number: 5,217,702
[45] Date of Patent: Jun. 8, 1993

[54] PREPARATION OF A HIGH SURFACE AREA GAMMA LITHIUM ALUMINATE

[75] Inventor: Teresita C. Frianeza-Kullberg, Gastonia, N.C.

[73] Assignee: FMC Corporation, Philadelphia, Pa.

[21] Appl. No.: 794,265

[22] Filed: Nov. 19, 1991

[51] Int. Cl.$^5$ ............................ C01F 7/02; C01F 7/04; C04B 38/02
[52] U.S. Cl. ........................................ 423/600; 501/84
[58] Field of Search .......................... 423/600; 501/84; 429/16; 156/645, 654, 667; 252/79.1, 79.2

[56] References Cited

U.S. PATENT DOCUMENTS 3,932,140  1/1976  Jayawant et al. ................. 23/293 A
4,704,266 11/1987  Kadokura et al. .................. 423/600

FOREIGN PATENT DOCUMENTS 0207663  1/1987  European Pat. Off. .
0235098  9/1987  European Pat. Off. .
0336322 10/1989  European Pat. Off. .
0045113  3/1983  Japan ................................. 423/600
270311  11/1988  Japan .
61314    3/1989  Japan .

OTHER PUBLICATIONS

Fuel Cell News vol. VII, No. 4, Dec., 1990, "Physical Property Optimization . . . Fuel Cell Matrices", by Patrick M. Brown.

Primary Examiner—Michael Lewis
Assistant Examiner—Steven Bos
Attorney, Agent, or Firm—Charles C. Fellows; Robert L. Andersen; Teresita F. Kullberg

[57] ABSTRACT

A process for preparing lithium aluminate of at least 95% gamma phase with surface areas greater than 10 $m^2/g$ by homogeneously mixing a gamma lithium aluminate with surface area of less than 8 $m^2/g$ with an aqueous hydrogen peroxide solution having a concentration of 5 to 70% for at least ½ hour at a temperature greater than 0° C. and less than 120° C., the treated gamma lithium aluminate is dried by heating to a temperature greater than 200° C. until dry and ground to produce a gamma-lithium aluminate with surface area greater than 10 $m^2/g$.

9 Claims, 8 Drawing Sheets

PREPARATION OF A HIGH SURFACE AREA GAMMA LITHIUM ALUMINATE

The present invention concerns the preparation of a high surface area predominately single phase gamma lithium aluminate by contacting hydrogen peroxide with a low surface area gamma lithium aluminate obtained from a lithium salt and an aluminum source.

Gamma-lithium aluminate is the candidate support material for the carbonate electrolyte in molten carbonate fuel cells. This support material is processed into a porous tile of about one square meter in area and from 0.5-2 mm thick by tape casting. Lithium aluminate is inert under the corrosive conditions of the molten carbonate fuel cell and at the operating temperature of around 650° C. However, lithium aluminate has three phases, namely: $\alpha$, $\beta$, $\gamma$. The presence of a mixture of phases can cause premature cracking of the tile and loss of electrolyte. Of these phases, the most stable is the $\gamma$ phase. A pure gamma phase lithium aluminate allows a lifetime of the tiles of as much as 40,000 hours.

To serve as an electrolyte holding material, $LiAlO_2$ must exist mainly in the gamma phase with a surface area greater than 10 m$^2$/g, and with minimum presence of the alpha or beta phases. Both the $\alpha$ and the $\beta$ phase convert to the $\gamma$ phase at temperatures greater than 700° C. Unfortunately, an increase in the calcination temperature brings about a decrease in the surface area of lithium aluminate to as low as 1 m$^2$/g. Attempts to produce high surface area $\gamma$-lithium aluminate have been reported in the literature.

One procedure developed to prepare a high surface area gamma lithium aluminate is the sol-gel route which is basically hydrolysis of the metal alkoxides to small particle solid powders, followed by calcination at elevated temperatures. Two European patents that report this method are EP 207,663 and EP 235,098 wherein surface areas of 30-40 m$^2$/g were obtained. Disadvantages of this process are the need for an inert atmosphere, the number of processing steps, and the length of time for completion of the process. Commercialization of this process will be complicated, labor intensive, and expensive.

Another mode of preparation for a high surface area $\gamma$-lithium aluminate is by contacting lithium aluminate with water alone or in the presence of water and an organic solvent with one or more hydroxyl groups as described in EP 336,322. In this patent, one hundred grams of $\gamma$-LiAlO2 with initial surface area of 22 m$^2$/g is contacted with 350 grams of distilled water for 31.25 days at room temperature. The resulting hydrate had the formula $Li_2Al_2O_4 \cdot 7H_2O$. Heat treatment for one hour at 650°, 800°, and 900° C. gave surface areas of about 80, 50, and 40 m$^2$/g, respectively. While this process is simple to implement in production, the long contact time with water is undesirable. Moreover, no x-ray powder diffraction pattern was included to indicate the phase of the resulting lithium aluminate product. The presence of a mixture of phases with the increase in surface area is possible due to the formation of the intermediate hydrate during contact with water for an extended time. The mixed phases generally occur at the lower temperature, such as 650° C., but the gamma phase is generally obtained at the more elevated temperature, such as 900° C.

Japanese Kokai Patent Publication No. 270311 also describes a similar process using water. In this invention, $\gamma$-LiAlO2 powder with a surface area of 20 m$^2$/g was hydrated in water for 16 hours at 30° C., filtered and heated at 500° C. for 2 hours. The resulting surface area was 84 m$^2$/g. When the contact time was reduced to 2 hours at 30° C., the surface area only increased from 20 to 52.8 m$^2$/g. No x-ray powder diffraction pattern was included to define the phase of lithium aluminate. It is possible to obtain a mixture of phases, $\alpha$, $\beta$, $\gamma$, under these conditions.

Acetic acid treatment of lithium aluminate to increase the surface area was described in Japanese Kokai Patent Publication No. 80319. Gamma-lithium aluminate with surface area of 20 m$^2$/g was mixed with 98.5 weight percent acetic acid for 2 hours at room temperature, filtered and dried at 120° C. for 2 hours. The resulting surface area was 53.6 m$^2$/g. No x-ray powder diffraction pattern was given to define the phase of the acetic acid treated-lithium aluminate; a mixture of phases may be present unless a single phase is confirmed by x-ray. It is also known that lithium aluminate has some solubility in acid solutions. Moreover, the drying temperature is not high enough to burn-off the excess carbon from $CH_3COOH$ entrained in the powder.

Lithium aluminate was also prepared by the addition of ammonium carbonate to a solution containing lithium nitrate, aluminum nitrate, and water to form the carbonates followed by calcination at 800° C. for 36 hours in air. This method was described in Kokai Patent Publication No. 61314, Mar. 8, 1989. The resulting surface area was 50-70 m$^2$/g, and the average particle size was 100 Angstroms. No x-ray powder diffraction pattern was included; therefore, the phase of the lithium aluminate obtained by this method is not known.

Confirmation of only a predominately single gamma phase lithium aluminate is important since the application for molten carbonate fuel cells requires that the lithium aluminate have a high surface area, about 10 m$^2$/g, but also have a predominately single gamma phase present. Many of these reported preparative methods do not report the phase of the final lithium aluminate product.

The present invention provides a process for increasing the surface area of a gamma phase lithium aluminate. These products are at least 95% gamma phase lithium aluminate. A low surface area $\gamma$-lithium aluminate such as a surface area of less than 8 m$^2$/g is finely ground, slurried at room temperature with hydrogen peroxide, vigorously mixed and later separated from the hydrogen peroxide. The recovered product is dried in an oven or a furnace. Analysis by x-ray and surface area show the presence of a predominantly single gamma phase lithium aluminate with surface areas from 10 to 50 m$^2$/g or greater. A low surface area $\gamma$-lithium aluminate can be produced by preparing a homogeneous mixture of a finely ground lithium salt, such as lithium hydroxide, and a stoichiometric amount of an aluminum source, such as $\gamma$-$Al_2O_3$, followed by calcination of the mixture in air at temperatures from 700°-900° C. for at least 2 hours. The mixture of salts to be calcined can be prepared by conventional techniques such as grinding, ball milling and the like. After calcining, the resulting product is a single phase $\gamma$-LiAlO2 with a surface area from 0.5-5 m$^2$/g, and a Li:Al molar ratio of about 1:1.

The low surface area $\gamma$-LiAlO2 is prepared from a lithium salt and an aluminum source. The process can use any of the ordinarily dry lithium salts which include, but are not limited to, lithium hydroxide, lithium carbonate, lithium nitrate, lithium peroxide, lithium oxalate, lithium acetate, lithium benzoate, lithium formate and the like. The aluminum source may be alumina, aluminum hydroxide, aluminum nitrate, aluminum alkoxide, boehmite and the like that are generally available commercially as dry powders. The homogeneous mixture of lithium salt and aluminum compound may be obtained by grinding, for example by ball milling, the two powdered ingredients together until a homogeneous mixture is obtained. A preferred mixture is produced by ball milling together stoichiometric amounts of lithium hydroxide and a $\gamma$-alumina with a surface area of at least 200 m$^2$/g. Using reasonable amounts of grinding media in a ball mill, a homogenous mixture of these materials can be obtained in about 4 hours. The amount of grinding time depends upon the usual grinding variables such as the equipment selected, loading and so forth.

Making low surface area $\gamma$-LiAlO$_2$ uses calcining temperatures of at least 700° C. as this limits the formation of mixed phases of the lithium aluminate product. Although temperatures above 900° C. can be employed the preferred temperature range for practicing this invention is 700° to 900° C., and preferably 750° to 800° C. as this range both avoids mixed phases, sintering and excessive agglomeration. Calcining is typically conducted for at least about 6 hours to insure completeness of the reaction; longer calcining periods, up to 24 hours or more, can be employed. Calcination periods as short as two hours produce a useful $\gamma$-lithium aluminate product, but longer calcination periods are preferred.

The low surface area $\gamma$-LiAlO$_2$ from whatever source is finely ground. The finely ground $\gamma$-lithium aluminate is then slurried with an aqueous hydrogen peroxide solution, vigorously mixed and filtered. Typically, this mixing is done at ambient temperature, but reduced or elevated temperatures may be employed.

A mixing period of at least 30 minutes produces small increases in the surface area of the $\gamma$-lithium aluminate; the mixing period may be followed by periods during which the product is not mixed. The mixing period may be extended for days with periodic addition of fresh hydrogen peroxide being added to the mixed product from time to time in order to achieve very high surface area product. While the mixing of the $\gamma$-lithium aluminate with hydrogen peroxide is most conveniently done at ambient temperature and pressure, higher temperatures and pressures can be employed if desired. Mixing is accompanied by a rise in temperature and some foaming or frothing which typically occurs about two hours after mixing is started.

Commercially available hydrogen peroxide in concentrations of 30% to 70% are generally employed in this process, but more dilute solutions of 5 to 30% may be employed. A 30% concentration has been found to give good results. The hydrogen peroxide treated product is dried at 200° C. to 600° C. with drying at 300° to 550° C. being preferred for a period of at least two hours to produce a high surface area gamma lithium aluminate product with surface area greater than 10 m$^2$/g. The densities of each of the three phases of lithium aluminate are different and so, density is a way to help identify phase. The alpha phase has a density of 3.6 g/cc, beta phase has a density of 2.8 g/cc, and gamma phase has a density of 2.6 g/cc.

The following examples further illustrate the invention. Unless indicated otherwise, all temperatures are in degrees centigrade, the lithium aluminate phase was determined by x-ray diffraction, the surface area determined by a BET surface area analyzer, and the density determined by a multipycnometer. In the X-ray diffraction patterns, the gamma peaks are identified by the symbol at the top of the peaks, and the best peaks by the symbol x.

PREPARATION OF LOW SURFACE LiAlO$_2$

Figure 1:
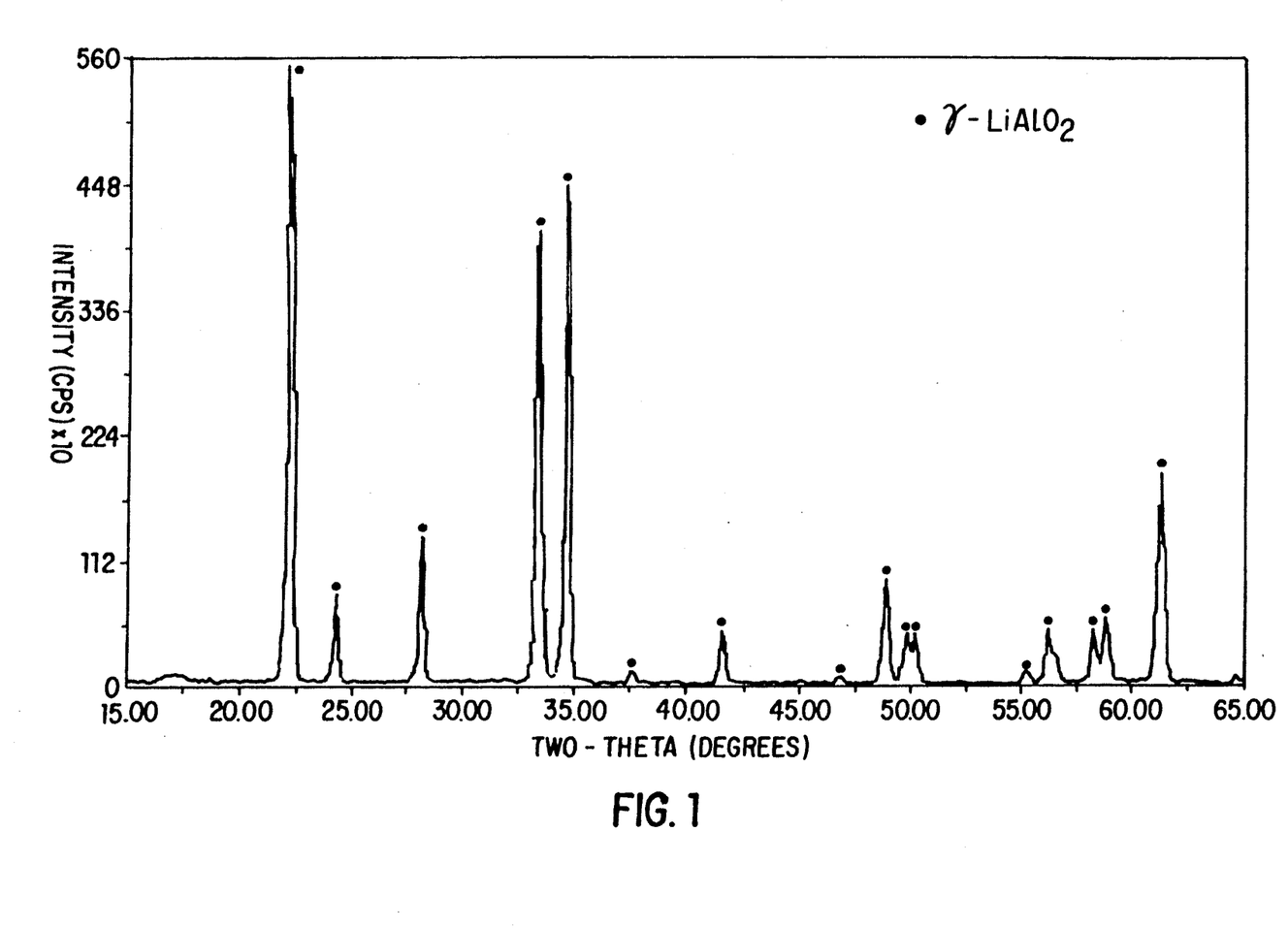
FIGS. 1 and 2 are X-ray analysis showing the presence of >99% $\gamma$-LiAlO$_2$.

One hundred sixty-eight grams (168 g) of lithium hydroxide monohydrate and two hundred eleven grams (211 g) of Versal GL, $\gamma$-Al$_2$O$_3$, were homogeneously mixed and ground by ball milling using zirconia or alumina balls for at least four hours. The balls were separated from the powder by sieving. The powder was transferred into an alumina sagger and fired in air at 750° C. for at least six hours. The fired product was again ground after cooling. Surface area of the lithium aluminate was 1.0 m$^2$/g. The density from pycnometry was 2.60 g/cc. X-ray analysis showed the presence of >99% $\gamma$-LiAlO2 as shown in FIG. 1.

EXAMPLE 1

Figure 2:
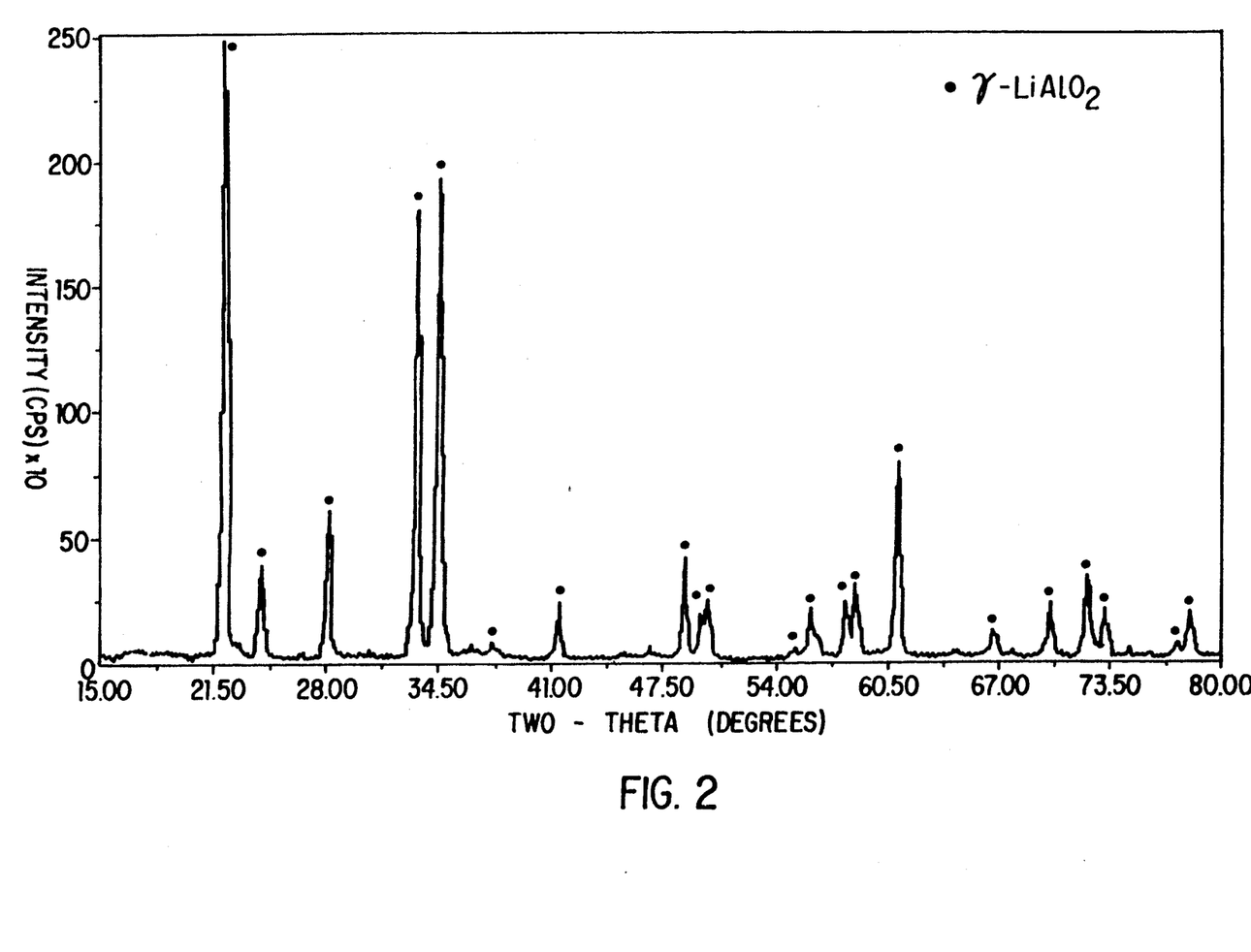

One hundred fifty grams of the low surface area $\gamma$-LiAlO$_2$ were blended with six hundred milliliters of 30% hydrogen peroxide for 30 seconds and agitated for 20 minutes using a magnetic stirrer. The mixture was allowed to stand for 16 hours at room temperature, calcined at 500° C. for 2 hours, then ground to break up agglomerates. Surface area analysis gave 14.9 m$^2$/g. The density was 2.59 g/cc. X-ray analysis in FIG. 2 showed the product to be >99% $\gamma$-LiAlO2. Chemical analysis showed the product to be 10.2 weight percent lithium, and 41 weight percent aluminum which corresponds to a 1:1 mole ratio of lithium to aluminum in $\gamma$-LiAlO$_2$.

EXAMPLE 2

Figure 3:
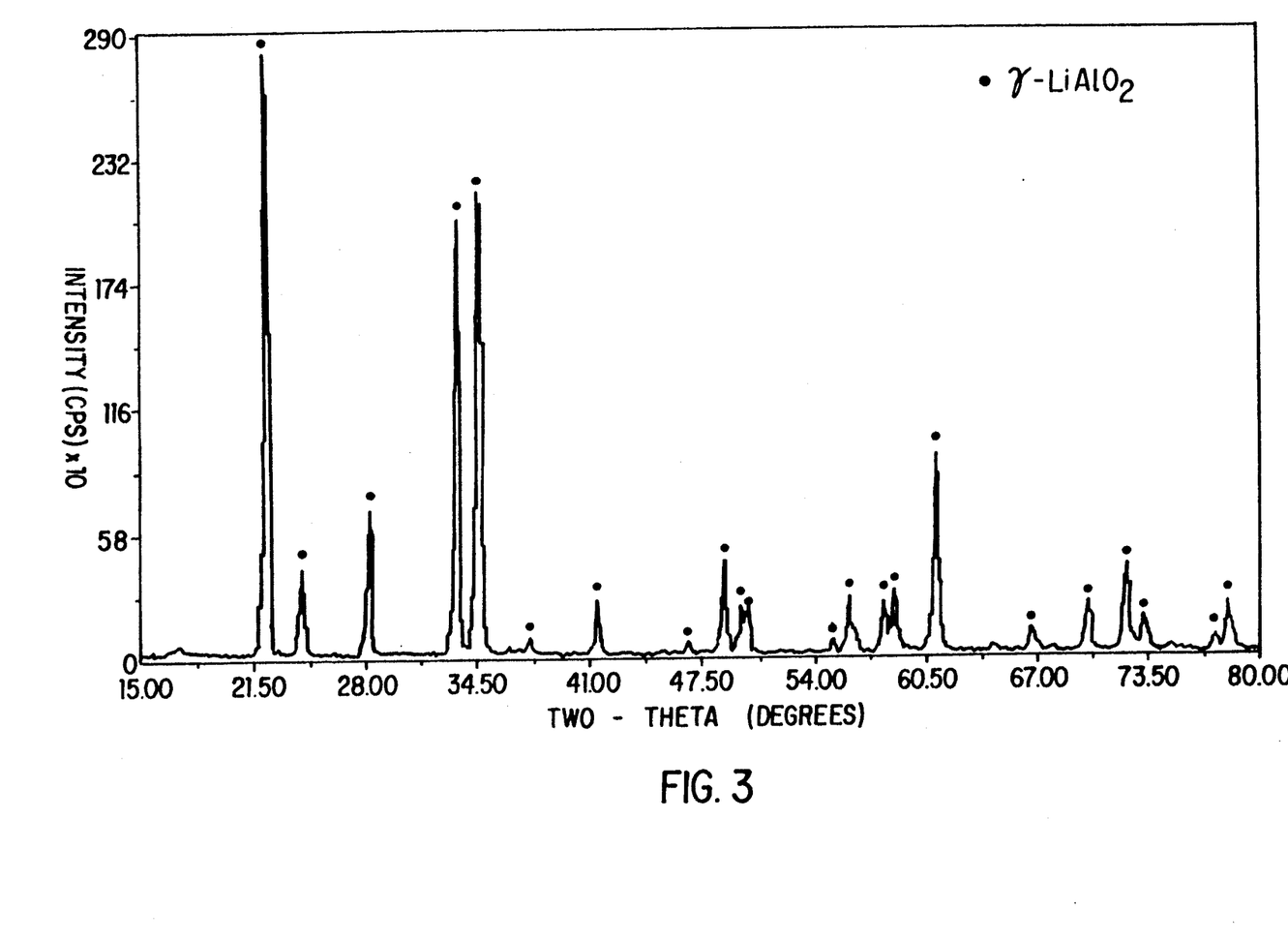
FIG. 3 is an X-ray analysis confirming the presence of single phase $\gamma$-LiAlO$_2$.

The product obtained in Example 1 was reslurried in fresh 30% hydrogen peroxide and stirred using a magnetic stirrer for 20 minutes at room temperature. The slurry was allowed to set for about 16 hours. The material was then calcined for 2 hours in air at 500° C., and ground to break-up agglomerates. The surface area increased to 35.4 m$^2$/g and X-ray analysis (FIG. 3) confirmed the presence of a single phase $\gamma$-LiAlO$_2$.

EXAMPLE 3

One hundred grams of the low surface area gamma lithium aluminate was agitated using a mechanical stirrer with 200 mL of 30% H$_2$O$_2$ for 30 minutes and allowed to stand for 23 hours. The $\gamma$-lithium aluminate was then separated from the hydrogen peroxide solution and the product was fired at 500° C. in air for 2 hours. After grinding, the density was 2.60 g/cc and surface area was 10.1 m²/g. The product was >99% γ-LiAlO2.

EXAMPLE 4

Figure 4:
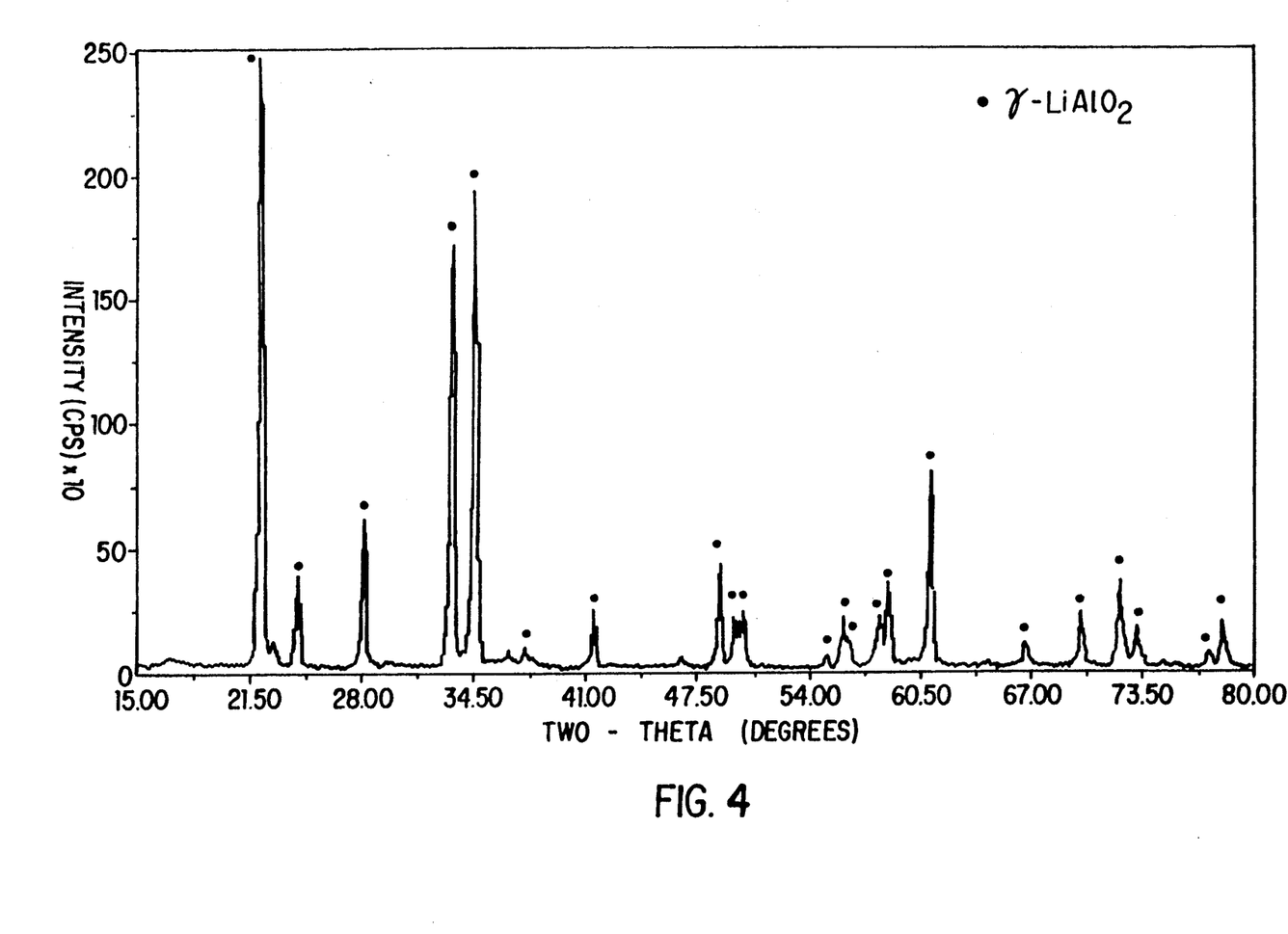
FIGS. 4 and 5 are X-ray analysis showing single phase $\gamma$-LiAlO$_2$.
Figure 5:
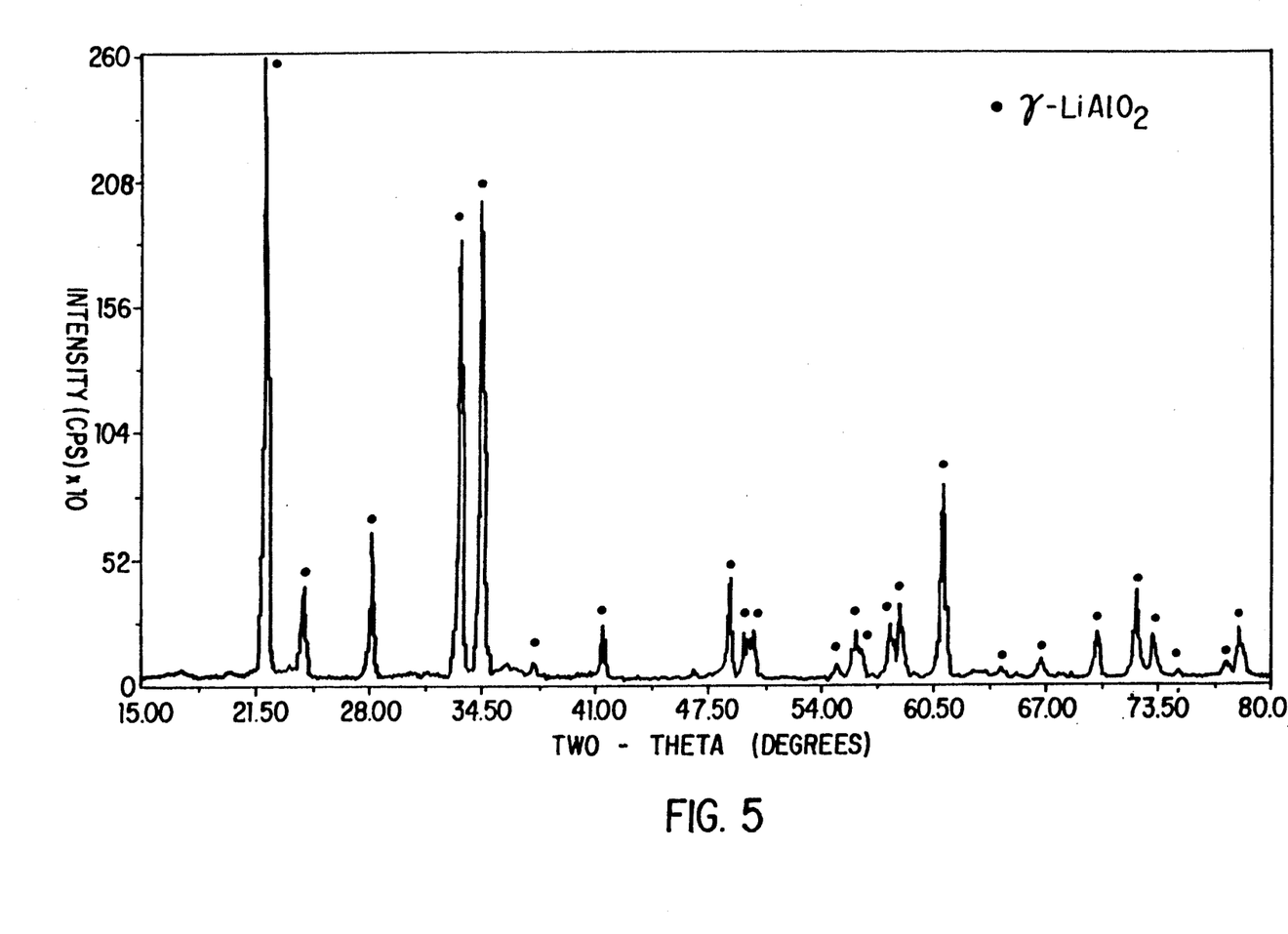

Another lithium aluminate sample was prepared and treated with hydrogen peroxide as was done in Example 1. The product was divided into two parts. One part was dried at 110° C. for 16 hours; the surface area was determined to be 12.0 m²/g. The other part was fired at 500° C. for 2 hours and the surface area was 13.9 m²/g. Both portions of the product were single phase gamma lithium aluminate by x-ray analysis. (FIGS. 4 and 5.)

EXAMPLE 5

Figure 6:
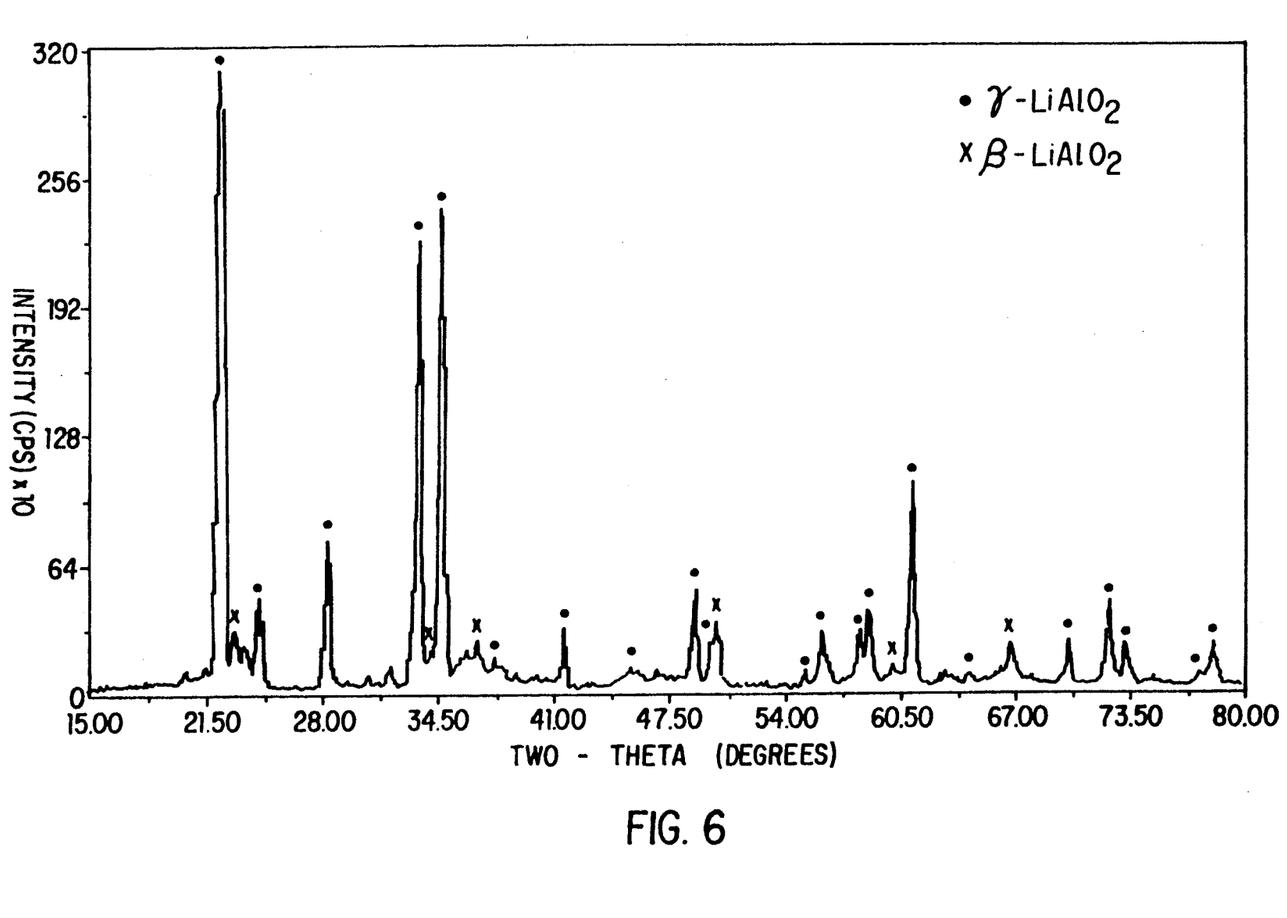
FIGS. 6 and 7 are X-ray analysis showing predominately gamma phase lithium aluminate.

One kilogram of gamma lithium aluminate prepared as in Example 1 was mixed using a mechanical stirrer with two liters of 30% hydrogen peroxide at room temperature for one day. Additional hydrogen peroxide (600 mL) was added on the 2nd day, and stirred for an additional 24 hours. The sample was then filtered and the particulate solid was fired at 500° C. for 2 hours in air. After grinding, the γ-lithium aluminate product had a surface area of 28.1 m²/g and a density of 2.62 g/cc. X-ray analysis showed a predominantly gamma phase lithium aluminate as shown in FIG. 6.

EXAMPLE 6

Figure 7:
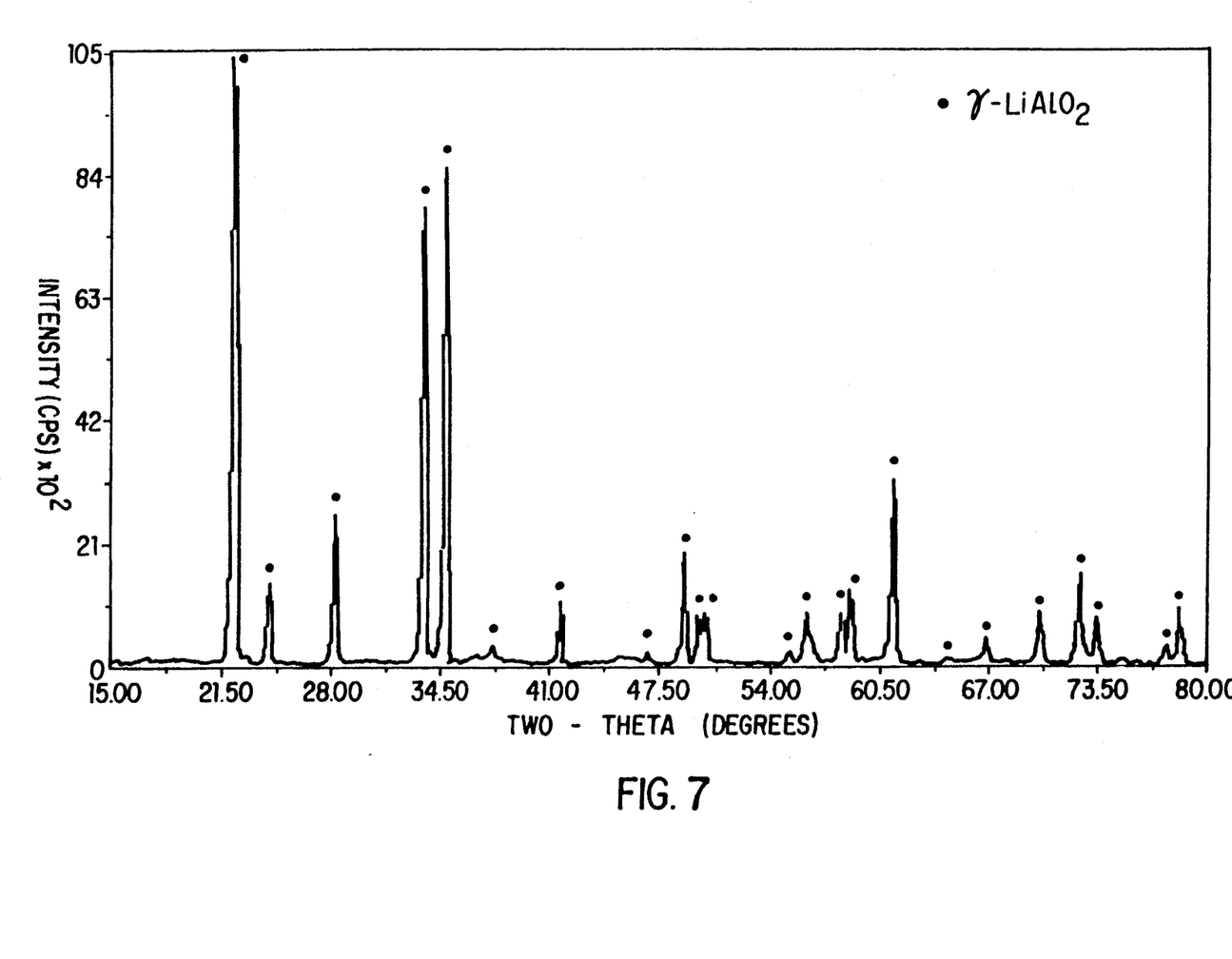

A 1:1 mole ratio of lithium carbonate and alumina was intimately mixed and then fired at 900° C. for at least 6 hours. The resulting product was >99% gamma lithium aluminate with surface area of 0.5 m²/g. One hundred grams of this material was mixed with 300 mL of 30% hydrogen peroxide using a mechanical stirrer for 72 hours and filtered. The solid was then fired at 500° C. for 2 hours and ground to break up agglomerates. The density of the product was 2.57 g/cc. Surface area was 11.0 m²/g. X-ray analysis (FIG. 7) showed the product to be predominantly gamma phase lithium aluminate.

EXAMPLE 7

One hundred grams of γ-lithium aluminate with surface area of 7.8 m²/g was agitated with 200 mL of 30% H₂O₂ for 24 hours. After filtration, the solid was fired at 500° C. in air for at least two hours then ground to break agglomerates. The density was 2.60 g/cc and the surface area increased to 22.6 m²/g. The product was predominately single phase γ-LiAlO₂.

Examples 1–3 illustrate that this process can employ a series of sequential operations wherein the calcined low surface area γ-lithium aluminate of 0.5 to 5 m²/g is repeatedly recycled through the hydrogen peroxide/drying cycle; that is, the γ-lithium aluminate is sequentially reslurried and agitated in fresh hydrogen peroxide for periods of ½ to 24 hours or more followed by recovery, drying and regrinding of the γ-lithium aluminate to produce products whose surface area increases with each additional process cycle. Repeating this cycle a second time, and more times, can increase the surface area of the γ-lithium aluminate from the range of 10 to 20 m²/g to greater than 20 m²/g.

Example 5 illustrates long term agitation of the calcined γ-lithium aluminate for a number of days with additional hydrogen peroxide being added from time to time. The time period and amount of hydrogen peroxide added from time to time can be adjusted to produce a γ-lithium aluminate having a surface area greater than 20 m²/g.

COMPARISON EXAMPLE A

One hundred fifty grams of gamma-lithium aluminate with surface area less than 2 m²/g and three hundred milliliters of distilled water were mixed together for twenty minutes at room temperature. The resulting slurry mixture was then allowed to age for about 16 hours at ambient temperature and calcined at 500° C. for two hours. The treated lithium aluminate did not have any increase in surface area and the phase was still the gamma phase.

COMPARISON EXAMPLE B

Figure 8:
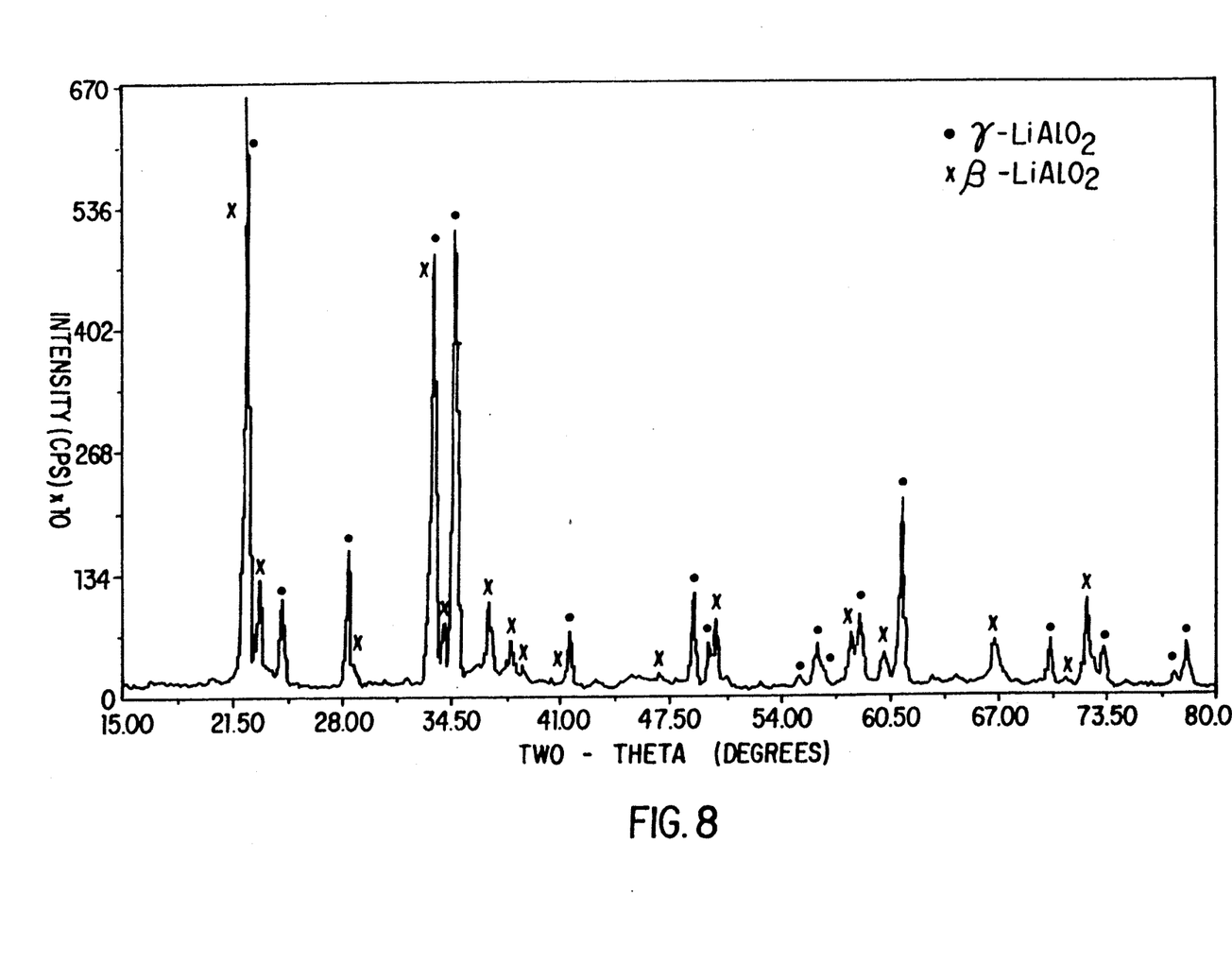
FIG. 8 is an X-ray powder diffraction pattern showing the presence of the $\beta$ and $\gamma$ phases of lithium aluminate.

Fifty grams of gamma-lithium aluminate and one hundred milliliters of water were mixed for 8 hours at 90° C. The resulting mixture was then filtered and the solid was fired at 500° C. for two hours. The surface area was 33.4 m²/g and the density was 2.7 g/cc. X-ray powder diffraction pattern showed the presence of the β and γ phases of lithium aluminate (FIG. 8).

I claim:

1. A process for preparing lithium aluminate of at least 95% gamma phase with a BET surface area greater than 10 m²/g by mixing a gamma lithium aluminate with surface area of less than 8 m²/g with an aqueous hydrogen peroxide solution having a concentration of 5 to 70% for at least ½ hour at a temperature greater than 0° C., separating the gamma lithium aluminate from the hydrogen peroxide and drying the gamma lithium aluminate by heating the gamma lithium aluminate to a temperature greater than 200° C. until dry and grinding the gamma lithium aluminate to produce a gamma-lithium aluminate with BET surface area greater than 10 m²/g.

2. The process of claim 1 wherein the lithium aluminate having a surface area of less than 8 m²/g is prepared by
   calcining a mixture of a lithium salt selected from the group consisting of lithium hydroxide, lithium carbonate, lithium nitrate, lithium peroxide, lithium oxalate, lithium acetate, lithium benzoate, and lithium formate and an aluminum source.

3. The process of claim 2 wherein the aluminum source is selected from the group consisting of alumina, aluminum hydroxide, aluminum nitrate, boehmite, and aluminum alkoxide.

4. The process of claim 2 wherein the calcining is conducted at a temperature between 750° and 800° C. for a period of at least six hours.

5. The process of claim 2 wherein the calcined lithium aluminate is gamma-lithium aluminate with a surface area from 0.5 to 5 m²/g.

6. The process of claim 1 wherein the gamma-lithium aluminate is mixed with a hydrogen peroxide solution having a concentration of at least 30% hydrogen peroxide.

7. The process of claim 1 wherein the gamma phase lithium aluminate having a BET surface area greater than 10 m²/g has a BET surface area from greater than 10 to 50 m²/g.

8. The process of claim 1 or claim 7 wherein the heating at greater than 200° C. is done for at least two hours at 300° to 550° C.

9. A process for preparing lithium aluminate of at least 95% gamma phase with a BET surface area greater than 20 m²/g by mixing a gamma-lithium aluminate with surface area from 0.5 to 8 m²/g with an aqueous hydrogen peroxide solution having a concentration of 5 to 70% for at least ½ hour at a temperature greater than 0° C. and less than 120° C., separating the gamma-lithium aluminate from the hydrogen peroxide and drying the gamma-lithium aluminate by heating to a temperature greater than 200° C. and grinding the gamma-lithium aluminate to obtain a gamma-lithium aluminate with BET surface area in the range of 10 to 20 m²/g, mixing the gamma-lithium aluminate with a BET surface area in the range of 10 to 20 m²/g with fresh hydrogen peroxide solution for at least ½ hour at a temperature greater than 0° C., and less than 120° C., separating the gamma-lithium aluminate from the hydrogen peroxide and drying the gamma-lithium aluminate by heating to a temperature greater than 200° C. and grinding the gamma-lithium aluminate to give a gamma-lithium aluminate with BET surface area greater than 20 m²/g.

* * * * *